United States Patent
Okamoto et al.

(10) Patent No.: US 6,177,500 B1
(45) Date of Patent: *Jan. 23, 2001

(54) AROMATIC POLYESTER COMPOSITION

(75) Inventors: Satoshi Okamoto, Niihama; Yoshifumi Yoshida, Minoo, both of (JP)

(73) Assignee: Sumitomo Cemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/110,237

(22) Filed: Jul. 6, 1998

(30) Foreign Application Priority Data

Jul. 8, 1997 (JP) .................................. 9-182125

(51) Int. Cl.$^7$ ....................................... C08K 3/34
(52) U.S. Cl. .................. 524/442; 528/298; 528/361; 524/449; 524/451
(58) Field of Search .................. 528/298, 361; 524/442, 449, 451

(56) References Cited

U.S. PATENT DOCUMENTS

| | | | |
|---|---|---|---|
| 4,431,770 | * 2/1984 | East et al. | 524/599 |
| 4,451,611 | 5/1984 | Cincotta et al. | |
| 5,677,392 | 10/1997 | Serizawa et al. | |
| 5,705,279 | 1/1998 | Migita et al. | |

FOREIGN PATENT DOCUMENTS

| | | |
|---|---|---|
| 0102719A1 | 3/1984 | (EP) . |
| 0167009A1 | 1/1986 | (EP) . |
| 0305846A2 | 3/1989 | (EP) . |
| 63-101416A | 5/1988 | (JP) . |

OTHER PUBLICATIONS

Kricheldorf et al., *Macromolecules*, vol. 24, pp. 4990–4996 (1991).

Hans R. Kricheldorf, et al, New Polymer Syntheses. 48. Thermotropic Copolyesters of 4'-Hydroxybiphenyl-4-carboxylic Acid and 4-Hydroxybenzoic Acid or 3–Chloro–4–hydroxybenzic Acid, Marcomolecules 1991, 24, 4990–4996.

"The Short and Long–Term Mechanical Properties of Filled and Unfilled Thermo–tropic Liquid Crystalline Polymer Injection Moldings", by C.J.G. Plummer et al. Journal of Applied Polymer Science vol. 48, No. 4, Apr. 20, 1993, pp. 731–740.

* cited by examiner

*Primary Examiner*—Samuel A. Acquah
(74) *Attorney, Agent, or Firm*—Birch, Stewart, Kolasch & Birch, LLP

(57) ABSTRACT

An aromatic polyester composition excellent in balance between heat resistance and mechanical strength is provided. The aromatic polyester composition constitutes as essential components 100 parts by weight of an aromatic polyester essentially containing a p-oxybenzoyl unit (A) represented by the following formula (I):

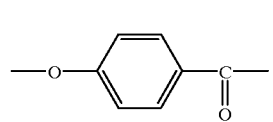

(I)

and a 4'-oxybiphenyl-4-carbonyl unit (B) represented by the following formula (II):

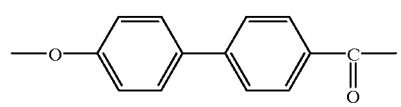

(II)

and 1 to 400 parts by weight of an inorganic filler.

4 Claims, No Drawings

AROMATIC POLYESTER COMPOSITION

FIELD OF THE INVENTION

The present invention relates to an aromatic polyester composition comprising an aromatic polyester containing a specific structural unit, and an inorganic filler. More particularly, the present invention relates to an liquid crystalline polyester composition having excellent balance between heat resistance and mechanical strength.

DESCRIPTION OF THE RELATED ART

Aromatic polyester compositions are known as engineering plastics having heat resistance. Recently, demands thereof are increasing for use in electronics parts.

It is known that aromatic polyesters can be obtained, for example, by poly-condensation of aromatic hydroxycarboxylic acids (X), aromatic diols (Y) and aromatic dicarboxylic acids (Z) as described in JP-A-54-77691 and JP-B-57-24407.

An aromatic polyester containing a p-oxybenzoyl unit (A) and a 4'-oxybiphenyl-4-carbonyl unit (B) is described in Macromolecules, 24, 4990(1991), H. R. Kricheldorf et al. However, there is scarce reference to mechanical properties thereof.

An aromatic polyester composition having higher heat resistance and mechanical properties is increasingly required with the increases of demands thereof.

SUMMARY OF THE INVENTION

An object of the present invention is to provide an aromatic polyester composition having excellent balance between heat resistance and mechanical strength.

The present inventors have intensively studied on improvement in quality of such an aromatic polyester composition, and have found that the object can be attained by an aromatic polyester composition comprising a specific structural unit.

The present invention provides an aromatic polyester composition comprising 100 parts by weight of an aromatic polyester (α) containing a p-oxybenzoyl unit (A) represented by the following formula (I):

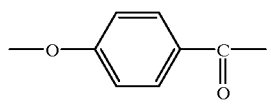
(I)

and a 4'-oxybiphenyl-4-carbonyl unit (B) represented by the following formula (II):

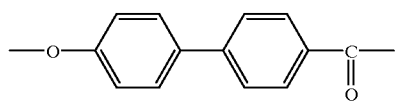
(II)

and 1 to 400 parts by weight of an inorganic filler (β).

DETAILED DESCRIPTION OF THE PREFERRED EMBODIMENTS

The ratio of p-oxybenzoyl unit (A)/4'-oxybiphenyl-4-carbonyl unit (B) in Aromatic polyester (α) is preferably 10 to 90/90 to 10% by mole, more preferably 20 to 80/80 to 20% by mole, and further more preferably 60 to 80/40 to 20% by mole, for exhibiting heat resistance and mechanical strength.

Aromatic polyester (α) contains the p-oxybenzoyl unit (A) and 4'-oxybiphenyl-4-carbonyl unit (B). Aromatic polyester (α) may further contain an oxycarbonyl unit (C) represented by the general formula (III):

(III)

wherein $Ar_1$ represents a divalent aromatic group which may be optionally substituted by a halogen atom, an alkyl group having 1 to 4 carbon atoms or a phenyl group, the biphenyl unit represented by the formula (II) being excluded;

a dioxy unit (D) represented by the general formula (IV):

(IV)

wherein $Ar_2$ represents a divalent aromatic group which may be optionally substituted by a halogen atom, an alkyl group having 1 to 4 carbon atoms or a phenyl group; or a dicarbonyl unit (E) represented by the general formula (V):

(V)

wherein $Ar_3$ represents a divalent aromatic group which may be optionally substituted by a halogen atom, an alkyl group having 1 to 4 carbon atoms, or a phenyl group;

within the range which is not harmful to the effect of the present invention.

The oxycarbonyl unit (C) include aromatic oxycarbonyl units and aliphatic oxycarbonyl units. Specific examples of aromatic oxycarbonyl units include oxybenzoyls such as m-oxybenzoyl, 3-chloro-4-oxybenzoyl and 2-methyl-4-oxybenzoyl, oxynaphthoyls such as 2-oxy-6-naphthoyl and 1-oxy-5-naphthoyl, and oxybiphenylcarboxylic acids such as 3'-oxybiphenyl-3-carbonyl and 2,6-dimethyl-4'-oxybiphenyl-4-carbonyl. Specific examples of aliphatic oxycarbonyl units include oxybutanoyl and oxypentanoyl.

The dioxy unit (D) include aromatic dioxy units and aliphatic dioxy units. Specific examples of the aromatic dioxy units include dioxybenzenes such as p-dioxybenzene, m-dioxybenzene and 3-methyl-1,4-dioxybenzene, dioxynaphthalenes such as 2,6-dioxynaphthalene and 1,5-dioxynaphthalene, and dioxybiphenyls such as 4,4'-dioxybiphenyl and 3,3'-dioxybiphenyl. Specific examples of the aliphatic dioxy units include 1,2-dioxyethane, 1,2-dioxypropane, 2,2-dimethyl-1,3-dioxypropane, 1,4-dioxybutane and 1,6-dioxycyclohexane.

The dicarbonyl unit (E) include aromatic dicarbonyl units and aliphatic dicarbonyl units. Specific examples of the aromatic dicarbonyl units include dicarbonylbenzenes such as terephthaloyl, isophthaloyl and methylterephthaloyl, dicarbonylnaphthalenes such as 2,6-naphthalenedicarbonyl and 1,5-naphthaenedicarbonyl, and dicarbonylbiphenyls such as 4,4'-dicarbonylbiphenyl and 3,3'-dicarbonylbiphenyl. Specific examples of aliphatic dicarbonyl units include dicarbonylethane and dicarbonylbutane.

The method for producing the aromatic polyester (α) used in the present invention is not particularly restricted. The aromatic polyester (α) can be produced, for example, by a polycondensation reaction of the corresponding lower aliphatic carboxylate of a hydroxycarboxylic acid, such as a polycondensation reaction of p-acetoxybenzoic acid and 4'-acetoxybiphenyl-4-carboxylic acid; or a polycondensation reaction of the corresponding phenylester of a hydroxycarboxylic acid, such as a polycondensation reaction of phenyl p-hydroxybenzoate and phenyl 4'-acetoxybiphenyl-4-carboxylate.

The above-mentioned polycondensation reactions are conducted in the substantial absence of a solvent, in the presence or absence of a polymerization catalyst such as sodium acetate and antimony trioxide, usually at a temperature of 250 to 380° C., in the presence of an inert gas such as nitrogen, under normal pressure, reduced pressure or combination thereof, with removing by-produced lower aliphatic carboxylic acid or phenol out of the system.

The resulting aromatic polyester may be used without any treatment. Alternatively, the resulted aromatic polyester can be subjected to solid phase polymerization in order to remove unreacted raw materials or to improve physical properties. The solid phase polymerization is preferably conducted according to a method in which the resulted aromatic polyester is mechanically pulverized and the pulverized material, still in solid phase condition, is treated at 250 to 350° C. in an atmosphere of an inert gas such as nitrogen or under reduced pressure for 1 to 20 hours. It is preferable to select the treatment temperature and temperature-raising speed in the solid phase polymerization so that aromatic polyester particles are not fused to bond each other.

The aromatic polyester ($\alpha$) used in the present invention preferably has a flow beginning temperature of 250 to 400° C., more preferably 270 to 370° C. When the flow beginning temperature is too low, the heat resistance of a molded article lowers. When the flow beginning temperature is too high, molding becomes difficult. The flow beginning temperature herein referred to is a temperature at which a melt viscosity of 48000 poise is exhibited when a capillary type rheometer equipped with a die having an internal diameter of 1 mm and a length of 10 mm is used and a heat-melted material is extruded through a nozzle at a temperature-raising rate of 4° C./minute under a load of 100 kg/cm$^2$.

Specific examples of the inorganic filler ($\beta$), which is another essential component used in the present invention, include glass fiber, glass bead, hollow glass sphere, glass powder, mica, talc, clay, silica, alumina, potassium titanate, wollastonite, calcium carbonate (heavy, light, glutinous), magnesium carbonate, basic magnesium carbonate, sodium sulfate, calcium sulfate, barium sulfate, calcium bisulfate, aluminum hydroxide, magnesium hydroxide, calcium hydroxide, calcium silicate, siliceous sand, quartz, titanium oxide, zinc oxide, iron oxide graphite, molybdenum, asbestos, silica alumina fiber, alumina fiber, gypsum fiber, carbon fiber, carbon black, white carbon, diatomaceous earth, bentonite, sericite, shirasu, graphite, metal or non-metal-based whiskers such as potassium titanate whisker, alumina whisker, aluminum borate whisker, silicon carbide whisker and silicon nitride whisker. Among other, glass fiber, glass powder, mica, talc, carbon fiber and the like are preferable. These inorganic fillers can be used alone, and may be used in combination of two or more.

These inorganic fillers ($\beta$) may be subjected to surface treatment. Examples of the surface treating agent include reactive coupling agents such as a silane-based coupling agent, titanate-based coupling agent and borane-based coupling agent, and lubricants such as a higher fatty acid, higher fatty acid ester, higher fatty acid metal salt and fluorocarbon-based surfactant. These surface treatment agents can be adsorbed on the surface of an inorganic filler ($\beta$) before kneading of an aromatic polyester ($\alpha$) and the inorganic filler ($\beta$), or can be supplied into a kneading apparatus together with an aromatic polyester ($\alpha$) and an inorganic filler ($\beta$) in kneading.

The aromatic polyester composition of the present invention comprises an inorganic filler ($\beta$) in an amount of 1 to 400 parts by weight, preferably of 10 to 250 parts by weight based on 100 parts by weight of the above-described aromatic polyester ($\alpha$). When the amount of the inorganic filler ($\beta$) is 400 parts by weight or more, injection molding becomes extremely difficult, and further, generation of flow mark in molding, poor appearance of a molded article and deficiency in mechanical strength tends to occur.

The composition of the present invention can contain other components in addition to the above-described essential components, within the range which is not harmful to the object of the present invention. Examples of the other component include other aromatic polyester resin than the above-described aromatic polyester ($\alpha$), other thermoplastic resins such as a polycarbonate resin, polyamide resin, polysulfone resin, polyphenylene sulfide resin, polyphenylene ether resin, polyether ketone resin and polyether imide resin, a small amount of thermosetting resins such as a phenol resin and epoxy resin, a releasing improving agent such as a fluorine resin and metal soaps, antioxidant, coloring inhibitor, coloring agent, stabilizer, ultraviolet absorbing agent, antistatic agent, plasticizer, lubricant, and flame retardant.

The composition of the present invention can be produced by supplying an aromatic polyester ($\alpha$) and an inorganic filler ($\beta$) to a usual kneading machine, such as a single-screw extruder, twin-screw extruder, Banbury mixer, roll, brabender, kneader and the like, separately or after pre-mixing them using a mortar, Henschel mixer, ball mill, ribbon blender and the like, followed by kneading them using the kneading machine. Alternatively, the composition of the present invention can be obtained by adding an inorganic filler ($\beta$) to an aromatic polyester ($\alpha$) melted in a reaction vessel, or by supplying an aromatic polyester ($\alpha$) and an inorganic filler ($\beta$) into a molding machine, followed by molding with melting and mixing them.

The aromatic polyester composition of the present invention can be molded into an article in the form of fiber, film or various shapes. Since the aromatic polyester composition is excellent particularly in mechanical properties, electrical properties, chemical resistance and oil resistance, the composition can be used for structure parts of a steel camera, heating cooking apparatus, automobile and the like; electric and electronic parts such as a switch, relay, connector, socket and the like; apparatuses for audio-visual such as a printer, copying machine, facsimile, video deck, video camera, floppy disk drive, hard disk drive, CD-ROM drive, photo-magnetic disk drive and the like.

The following examples further illustrate the present invention in detail, but do not limit the scope of the present invention. In examples, all % are by weight unless otherwise stated. Various physical properties were measured as follows.

Flow beginning temperature: It is an index representing melt flowability, and a temperature at which a melt viscosity of 48000 poise is exhibited under the following conditions.

Measuring apparatus:
  Capillary type rheometer (Flow tester CFT-500 type manufactured by Shimadzu Corporation)
Measuring condition:
  Temperature-raising rate: 4° C./minute
  Pressure: 100 kg/cm$^2$
  Nozzle: internal diameter: 1 mm
  Length: 10 mm
Tensile strength: according to ASTM D-638
  Specimen: Dumbbell type×6; Distance between gauze lines: 40 mm Tensile rate: 5 mm/minute Flexural modulus: according to ASTM D-790

Specimen: rod×6

Deflection temperature under load: according to ASTM D-648

Pressure: 18.6 kg/cm$^2$

Temperature-raising rate: 2° C./minute

Synthesis Example 1

Into a 3 L glass flask equipped with a reflux condenser, thermometer, nitrogen introducing tube and stirring rod was charged 997 g (7.0 mol) of p-hydroxybenzoic acid, 643 g (3.0 mol) of 4'-hydroxybiphenyl-4-carboxylic acid and 1123 g (11.0 mol) of acetic anhydride. The contents were heated up to reflux temperature with stirring and with flowing a nitrogen gas slowly and kept at the reflux temperature for further 3 hours for effecting acetylation reaction. Then, the reflux condenser was substituted by a Liebig condenser, and acetic acid was distilled off with heating up to 200° C. Further, the contents were heated up to 320° C. with distilling off acetic acid, and polymerization was effected for 1 hour and 30 minutes at 320° C., with distilling acetic acid, to obtain 1351 g of a prepolymer. The resulted prepolymer was pulverized to a particle having an average particle size of 1 mm or less by a pulverizer. The pulverized material was charged into an oven and heated from room temperature to 240° C. with nitrogen flow at 20 L/minute, and further heated from 240° C. to 250° C. over 5 hours. Thereafter, it was kept at 250° C. for 3 hours for solid phase polymerization to obtain 1324 g of a polyester having a flow beginning temperature of 325° C.

Synthesis Example 2

Into the same apparatus as in Synthesis Example 1 was charged 1105 g (8.0 mol) of p-hydroxybenzoic acid, 428 g (2.0 mol) of 4'-hydroxybiphenyl-4-carboxylic acid and 1123 g (11.0 mol) of acetic anhydride, and the polymerization reaction was conducted in the same manner as in Example 1, to obtain 1279 g of a prepolymer. Further, the solid phase polymerization was conducted in the same manner as in Synthesis Example 1, to obtain 1253 g of a polyester having a flow beginning temperature of 342° C.

Synthesis Example 3

Into the same apparatus as in Synthesis Example 1 was charged 829 g (6.0 mol) of p-hydroxybenzoic acid, 857 g (4.0 mol) of 4'-hydroxybiphenyl-4-carboxylic acid and 1123 g (11.0 mol) of acetic anhydride, and the acetylation reaction was conducted in the same manner as in Synthesis Example 1. Thereafter, the reflux condenser was substituted by a Liebig condenser, and acetic acid was distilled off with heating up to 200° C. Further, the contents were heated up to 320° C. with distilling off acetic acid, and when reached 320° C., the pressure of the system was reduced down to 1 kPa, and polymerization was conducted for 1 hour and 30 minutes under this condition, to obtain 1409 g of a polyester having a flow beginning temperature of 324° C.

Comparative Synthesis Example 1

Into the same apparatus as in Synthesis Example 1 was charged 829 g (6.0 mol) of p-hydroxybenzoic acid, 376 g (2.0 mol) of 4,4'-dihydroxybiphenyl, 249g (1.5 mol) terephthalic acid, 83 g (0.5 mol) of isophthalic acid and 1123 g (11.0 mol) of acetic anhydride, and the polymerization reaction was conducted in the same manner as in Example 1, to obtain 1279 g of a prepolymer. Further, the solid phase polymerization was conducted in the same manner as in Synthesis Example 1, to obtain 1250 g of a polyester having a flow beginning temperature of 330° C.

Comparative Synthesis Example 2

Into the same apparatus as in Synthesis Example 1 was charged 1008 g (7.3 mol) of p-hydroxybenzoic acid, 514 g (2.3 mol) of 2-hydroxy-6-naphthoic acid and 1123 g (11.0 mol) of acetic anhydride, and the polymerization reaction was conducted in the same manner as in Synthesis Example 3, to obtain 1232 g of a polyester having a flow beginning temperature of 261° C.

EXAMPLE 1

600 g of the polyester obtained in Synthesis Example 1 and 400 g of glass fiber (CS03JAPx-1, manufactured by Asahi Fiber Glass Co.) were mixed by a Henschel mixer, then, the mixture was granulated at a cylinder temperature of 340° C. using a twin-screw extruder (PCM-30 type manufactured by Ikegai Corporation), to obtain pellets of a resin composition. These pellets were dried for 3 hours at 120° C., then, injection-molded at a cylinder temperature of 350° C. and a mold temperature 130° C. using an injection molding machine (PS40E5ASE type Nissei Plastic Industries Co.), to obtain a specimen. The resulted specimen had a tensile strength of 1810 kg/cm$^2$, an elastic modulus of 8.2×10$^4$ kg/cm$^2$ and a deflection temperature under load of 278° C.

EXAMPLES 2 TO 5

Comparative Examples 1 to 2

A mixture of the polyester obtained in the synthesis example and an inorganic filler was granulated to obtain pellets, then, the pellets were injection-molded to obtain a specimen, according to the same manner as in Example 1.

The polyester and the inorganic filler used, and the ratio of the polyester to the inorganic filler, and the tensile strength, elastic modulus and thermal deformation temperature of the resulted specimens are summarized in Tables 1 and 2.

TABLE 1

|  | Example 1 | Example 2 | Example 3 |
|---|---|---|---|
| Polyester | Synthesis Example 1 | Synthesis Example 2 | Synthesis Example 3 |
| Inorganic filler | GF | GF, Talc | GF |
| (parts by weight) | 67 | 50, 20 | 70 |
| Tensile strength (kg/cm$^2$) | 1810 | 1680 | 1770 |
| Elastic modulus (× 10$^4$ kg/cm$^2$) | 8.2 | 7.6 | 7.6 |
| Deflection temperature under load (° C.) | 278 | 276 | 280 |

TABLE 2

|  | Example 4 | Example 5 | Comparative example 6 | Comparative Example 7 |
|---|---|---|---|---|
| Polyester | Synthesis Example 3 | Synthesis Example 3 | Comparative Synthesis Example 1 | Comparative Synthesis Example 2 |
| Inorganic filler | GF | GF | GF | GF |
| (parts by weight) | 40 | 70 | 67 | 67 |
| Tensile strength (kg/cm$^2$) | 1660 | 1680 | 1660 | 2100 |
| Elastic modulus (× 10$^4$ kg/cm$^2$) | 7.2 | 7.5 | 7.5 | 10.1 |

TABLE 2-continued

|  | Example 4 | Example 5 | Comparative example 6 | Comparative Example 7 |
|---|---|---|---|---|
| Deflection temperature under load (° C.) | 244 | 246 | 279 | 228 |

GF: CS03JAPx-1; glass fiber manufactured by Asahi Fiber Glass Co.
Talc: X-50; manufactured by Nippon Talc Co.
Parts by weight of inorganic filler: per 100 parts by weight of polyester The aromatic polyester composition of the present invention is excellent in balance between heat resistance and mechanical strength.

What is claimed is:

1. An aromatic polyester composition consisting essentially of 100 parts by weight of an aromatic polyester containing an oxycarbonyl unit which consists of 60 to 80% by mole of a p-oxybenzoyl unit represented by the following formula (I):

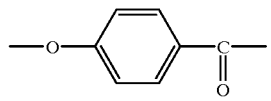

(I)

and 40 to 20% by mole of a 4'-oxybiphenyl-4-carbonyl unit represented by the following formula (II)

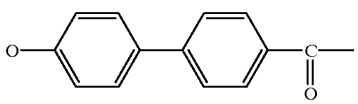

(II)

and 1 to 400 parts by weight of an inorganic filler.

2. The aromatic polyester composition of claim 1, wherein the inorganic filler is present in an amount of 10 to 250 parts by weight based on 100 parts by weight of the aromatic polyester.

3. The aromatic polyester composition of claim 1, wherein the inorganic filler is kneaded into the composition.

4. The aromatic polyester composition of claim 3, wherein the inorganic filler is present in an amount of 10 to 250 parts by weight based on 100 parts by weight of the aromatic polyester.

* * * * *